April 30, 1940.   T. N. FRITZSCH   2,199,287
RESILIENT CAR WHEEL
Filed May 1, 1939   2 Sheets-Sheet 1

Inventor:
THEODORE N. FRITZSCH,
by: John E. Jackson
his Attorney

April 30, 1940.   T. N. FRITZSCH   2,199,287
RESILIENT CAR WHEEL
Filed May 1, 1939   2 Sheets-Sheet 2
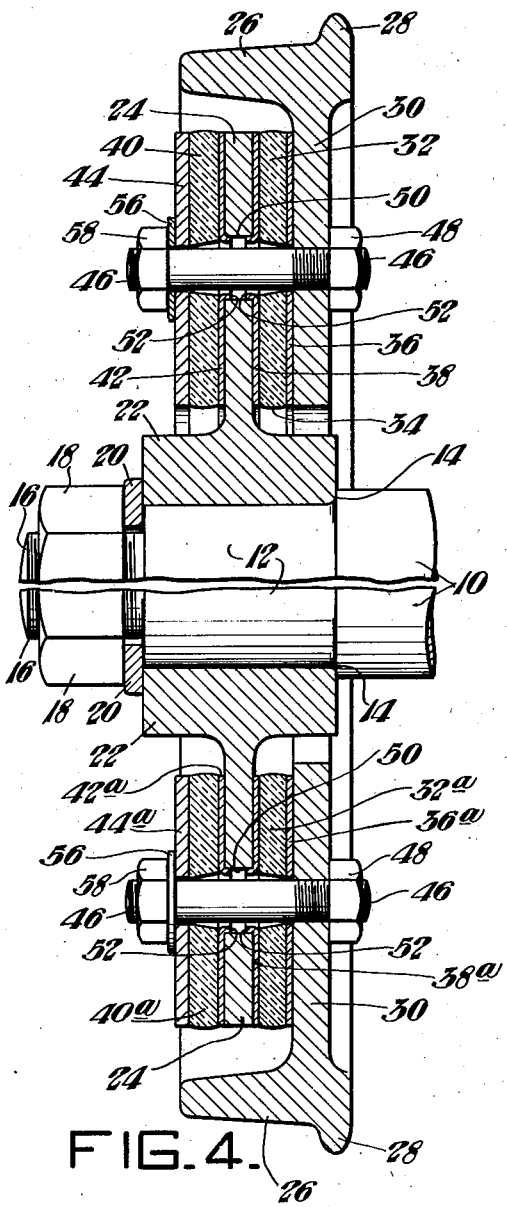
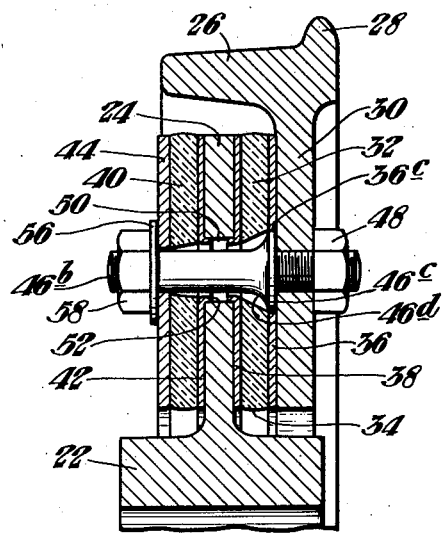
Inventor:
THEODORE N. FRITZSCH,
by: John E. Jackson,
his Attorney.

Patented Apr. 30, 1940

2,199,287

UNITED STATES PATENT OFFICE 2,199,287

RESILIENT CAR WHEEL

Theodore N. Fritzsch, Johnstown, Pa.

Application May 1, 1939, Serial No. 271,142

3 Claims. (Cl. 295—11)

This invention relates to wheels of the type having a metal tread adapted to run on rails and having interposed between the tread and the axle resilient members for cushioning shocks and lessening noise when in operation.

Wheels of this general character are broadly old, and the present invention relates to the structural features recited in the claims which will be apparent from the following detail disclosure, when read in connection with the accompanying drawings.

In the drawings:

Figure 3 is a section on line III—III of Figure 1;

Figure 4 is a section on line IV—IV of Figure 2;

Figure 5 is a fragmentary section illustrating an alternative detail of construction; and Figure 6 is a similar detail illustrating a further alternative construction.

Figure 1:
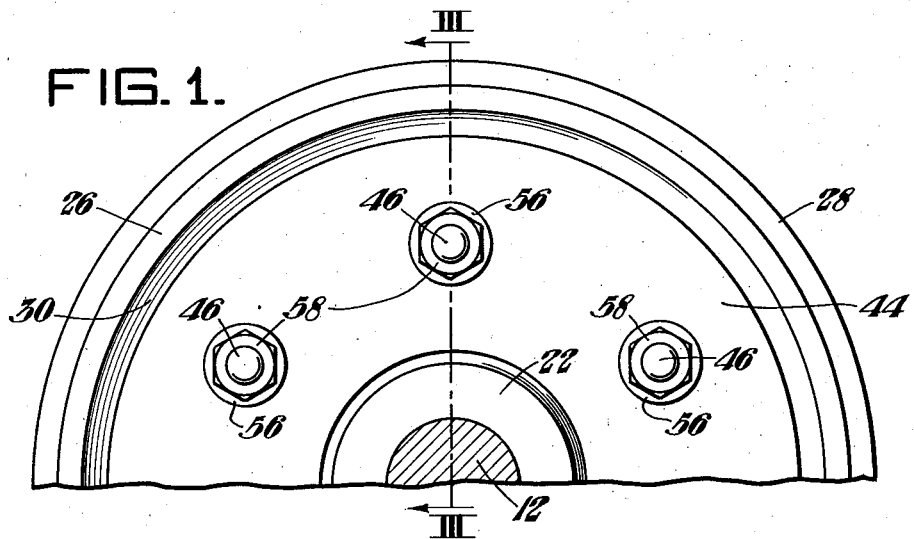
Figure 1 is an elevation of approximately half of a wheel embodying the invention.

In wheels of the prior art of the general type to which the present invention relates, resilient material, generally rubber, is mounted adjacent the two outer sides of the web of the wheel and the inner sides of two plates secured to a hub. Such prior art arrangement necessitates an expensive hub assembly. Moreover, due to the fact that the wheel web is surrounded on its two largest surfaces by rubber, heat generated by rolling and skidding is retained in the wheel structure for a considerable length of time. This tends to have a deteriorating effect on the rubber or other resilient cushions. Upon deterioration of such resilient cushions, a wobbly and unsatisfactory wheel results.

The improved wheel of the present invention is so constructed and arranged that one entire side face of the web of the wheel is exposed to the air and thus effectively facilitates the dissipation of heat set up in the wheel structure. This results in an improved wheel by lengthening the service life of the cushion elements.

The wheel comprises a metal rim or tread portion adapted to ride on the rail, an inwardly extending web which is apertured at the center of rotation of the wheel to permit relative radial motion with respect to the axle or shaft of the hub carried by the wheel, a hub having a radially extending annular web spaced from the rim web, and cushion members which are interlocked with the hub web on opposite faces thereof, all of the cushion members being located on one side of the rim web. Thus one entire side of the rim web is exposed to the air so as to facilitate the dissipation of heat. The rim web has a number of cantilever extensions extending laterally which pierce the cushion members and pass through apertures in the hub web. These cantilevers carry elements for compressing the cushion members in assembled relation with respect to the hub web and the rim web.

Referring in detail to the drawings, the numeral 10 represents the wheel axle, the end 12 of which is reduced in diameter to provide a shoulder 14 and the extremity of the axle is provided with a threaded shank 16 for the reception of a nut 18 which coacts with a washer 20 to hold the wheel hub 22 on the axle portion 12 and against the shoulder 14. Extending radially outward from the hub 22 there is a hub web 24.

A wheel rim 26 having a suitable rail engaging flange 28 is provided with a rim web 30 which is disposed in laterally spaced relation with respect to the hub web by a resilient cushion or cushions. In the embodiment of the invention illustrated in Figure 1, the cushion 32 is in the form of an annular washer-like ring being apertured at 34 to permit relative movement between it and the hub 22. In the embodiment of the invention illustrated in Figures 2 and 4, the cushions, instead of being of annular or washer-like form, are in the nature of a plurality of separate units, indicated at 32ª. These cushions may be of suitable circular or polygonal shape. Figure 2 illustrates cushions of hexagonal contour, this shape having the advantage that a plurality of separate cushions can be cut from flat stock with a minimum amount of waste.

Figure 2:
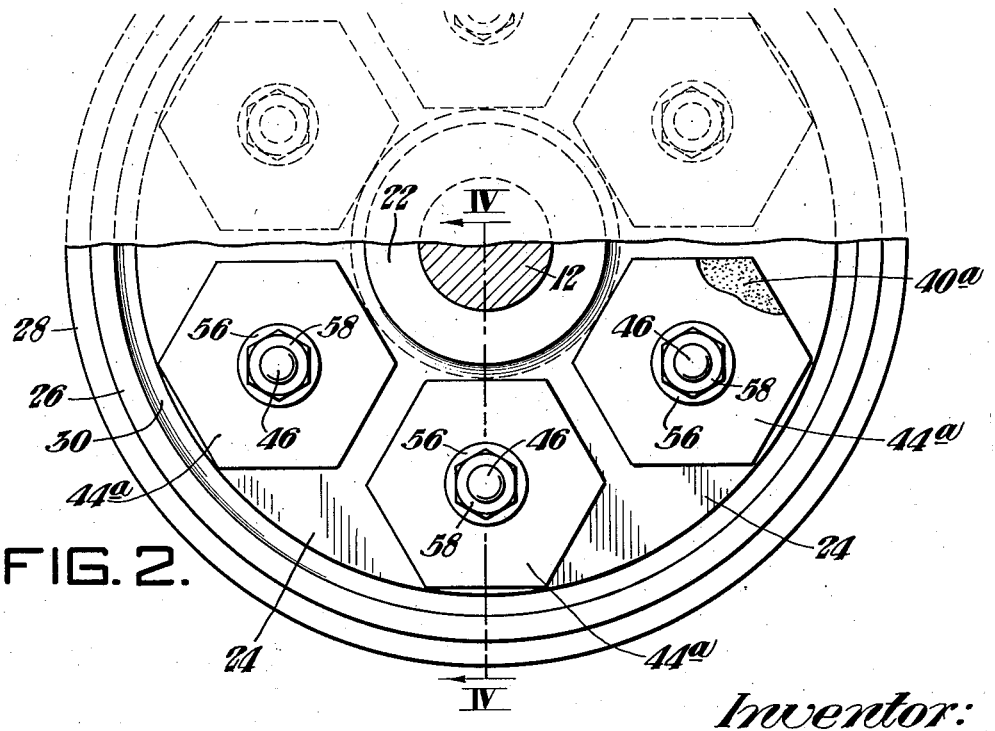
Figure 2 is a similar half elevation of a slightly modified embodiment of the invention.

Regardless of whether the annular cushions of Figures 1 and 3 or the separate cushions of Figures 2 and 4 are used, they will have metallic face plates 36 and 38 bonded thereto. The cushions 32ª will have similar plates 36ª and 38ª bonded thereto.

Located for coaction with the outer face of the hub web 24 are cushions 40 and 40ª quite similar to those designated at 32 and 32ª. The cushions 40 and 40ª have bonded thereto metallic plates 42 and 44 and 42ª and 44ª, respectively.

The rim web carries a plurality of cantilever studs 46 which may be screwed thereto and locked by nuts 48, as shown in Figure 3, or which may be formed as an integral part of the web structure, as indicated at 46ª in Figure 6. The cantilever studs pierce suitable openings formed in the cushion members and in the metallic plates bonded thereto, as clearly illustrated in the drawings. In some cases the plates 38 and 42 will be formed with laterally extended sleeve portions 50 and 52. These extensions engage suitable apertures 54 formed in the hub web 24 and thus may be said to dowel the cushions to such web. Each dowel stud at its outer end carries a washer 56 and a nut 58, and when the several nuts carried by several cantilever studs are screwed home, they serve to place the cushion members in the desired state of high compression. With the cushion members held in such a state of compression in an assemblage such as shown and described, the hub web and rim web are firmly held in such a way that a load applied to the assemblage will be absorbed by the rubber in shear with the aid of or acting through said studs.

Figure 5 illustrates a slightly modified construction of cantilever stud 46ᵇ which is provided with an enlarged collar portion 46ᶜ having a fillet portion 46ᵈ connecting the collar portion with the shank. In this modified construction the cushion plate 36 will have an aperture 36c of a size to make a snug fit with said collar portion.

From the foregoing it will be seen that the detail construction and arrangements of the described structure provides means whereby one entire side face of the rim web is exposed to the air. In this way the wheel assemblage differs from structures of the prior art wherein the rubber cushion elements engage both faces of the web. The improved wheel provides for extremely rapid dissipation of the heat occasioned by braking, skidding or rolling of the wheels and tends to increase the longevity of the cushions of rubber or other resilient material usually employed.

I claim:

1. A wheel of the character described comprising a circular rim having an inwardly extending web, a hub having an outwardly extending web, cushion members interlocked with the hub web on opposite faces thereof and all located on one side of the rim web, whereby the entire opposite side of the latter is exposed to the air to facilitate dissipation of heat, and cantilevers extending laterally from the rim web piercing said cushion members and passing freely through apertures in the hub web, and means coacting with said cantilevers for compressing the cushion members.

2. A wheel of the character described comprising a circular rim having an inwardly extending web, a hub having an outwardly extending web, the rim web having a central opening of a size to permit radial movement thereof relative to the hub, the inside diameter of the rim being sufficiently greater than the outside diameter of the hub rim to permit such relative movement, a series of cantilever studs secured to said rim web, solid cushions of resilient material disposed on opposite sides of the hub web but all located on one side of the rim web, whereby one entire side face of the latter is exposed to the air to facilitate dissipation of heat, said cushion members being pierced by said studs, and means carried by the studs for compressively integrating the cushions with said hub web and said rim web.

3. The wheel of claim 2 further characterized by the inclusion of thin metal plates bonded to the faces of the cushion member adjacent said hub web, said thin plates having portions interlocked with the hub web, a thicker plate engaging the outer face of the cushion member remote from said hub web and nuts screwed on said cantilever studs acting through said thicker plate to compressively integrate said cushions with said hub web and said rim web.

THEODORE N. FRITZSCH.